United States Patent [19]

Leach, Jr.

[11] 4,077,650
[45] Mar. 7, 1978

[54] CUSHIONING MEANS FOR GOOSE NECK HITCH

[75] Inventor: Clayton R. Leach, Jr., Fairmont, Minn.

[73] Assignee: Fairmont Steel Products, Inc., Fairmont, Minn.

[21] Appl. No.: 748,097

[22] Filed: Dec. 6, 1976

[51] Int. Cl.² ............................................. B60D 1/00
[52] U.S. Cl. .............................. 280/423 R; 280/484
[58] Field of Search .............. 280/423 R, 423 B, 488, 280/489, 484, 485, 486, 483, 439, 440

[56] References Cited

U.S. PATENT DOCUMENTS

| 1,619,094 | 3/1927 | Thomas | 280/483 |
|---|---|---|---|
| 2,996,312 | 8/1961 | Paul | 280/439 X |
| 3,945,668 | 3/1976 | Holland | 280/423 R |

Primary Examiner—Joseph F. Peters, Jr.
Assistant Examiner—John A. Pekar
Attorney, Agent, or Firm—Williamson, Bains, Moore & Hansen

[57] ABSTRACT

A goose neck hitch device includes a hitch frame comprised of a pair of vertical frame members adapted to be secured to the front of a trailer and a pair of longitudinal frame members which are secured to the upper ends of the vertical frame members and converge forwardly therefrom. An upper hitch member is secured to the front ends of the longitudinal frame members and extends downwardly therefrom. A lower hitch member telescopically engages the upper hitch member and extends downwardly therefrom, the lower end of the lower hitch member having coupling means thereon for connection to coupling means on a towing vehicle such as a pick-up truck. A cushioning mechanism is interposed between the upper hitch member and the lower hitch member and serves to dampen shock impulses exerted by the trailer through the hitch device to the towing vehicle. In one form of the invention, the cushioning mechanism includes a pair of yieldable elements, and in another form of the invention the cushioning mechanism includes a container containing a compressable fluid such as air.

6 Claims, 4 Drawing Figures

U.S. Patent  March 7, 1978  4,077,650
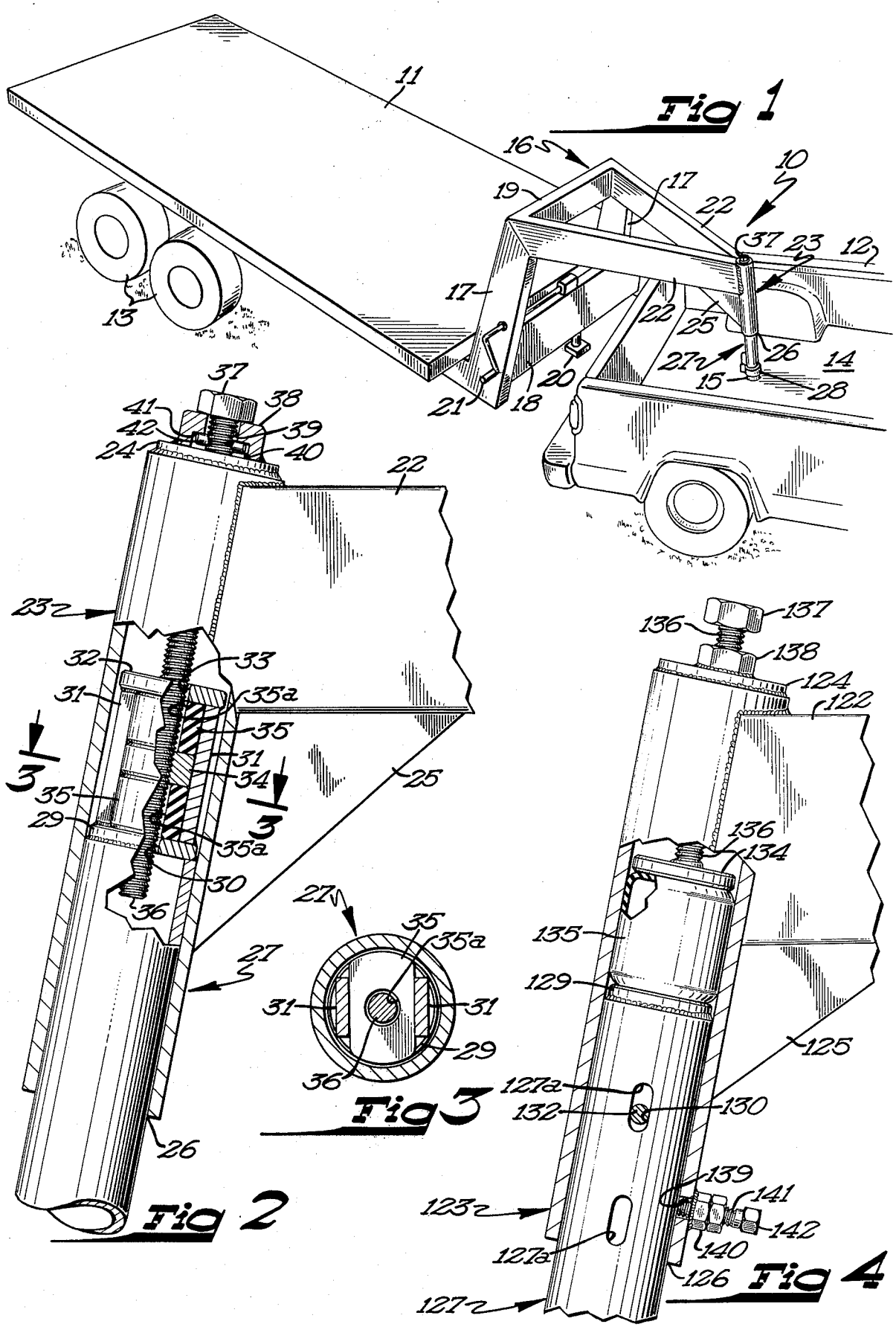

CUSHIONING MEANS FOR GOOSE NECK HITCH

SUMMARY OF THE INVENTION

This invention relates to goose neck hitch devices and more particularly to a goose neck hitch device having cushioning means incorporated therein.

Goose neck hitch devices are used extensively in the agricultural and industrial fields for interconnecting trailers to towing vehicles, such as pick-up trucks and the like. The construction of the goose neck hitch device allows the hitch to be connected to the towing vehicle forwardly of the rear bumper so that the load exerted by the trailer is located forwardly of the rear axle of the towing vehicle.

However, it has been found that when a trailer incorporating a goose neck hitch is towed over a rough surface, the bouncing jolts of the trailer are transferred directly to the vehicle through the goose neck hitch. This jolting motion sometimes affects the stability of the towing vehicle.

It is therefore a general object of this invention to provide a novel goose neck device incorporating cushioning means therein for absorbing shock forces transferred to the hitch by the trailer.

More specifically, the cushioning means incorporated in the goose neck hitch device includes compressable elements interposed between telescoping vertical hitch members of the goose neck hitch. In another embodiment, the cushioning means includes a container containing a compressable fluid and which is interposed between the telescoping hitch members of the goose neck hitch. In both embodiments shock forces transferred through the goose neck trailer are absorbed and dampened by the cushioning means.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a perspective view showing the novel goose neck hitch device mounted on a trailer and illustrating portions of a towing vehicle;

FIG. 2 is a fragmentary side view of the goose neck hitch device with certain parts thereof broken away for clarity;

FIG. 3 is a cross-sectional view taken approximately along Line 3—3 of FIG. 2 and looking in the direction of the arrows; and FIG. 4 is a fragmentary side view similar to FIG. 2 of a portion of the goose neck hitch device but illustrating a modified form thereof.

DESCRIPTION OF THE PREFERRED EMBODIMENT OF THE INVENTION

Referring now to the drawings and more specifically to FIG. 1, it will be seen that one embodiment of the novel goose neck hitch device, designated generally by the reference numeral 10 is thereshown. The goose neck hitch device 10 is mounted on a conventional flat-bed trailer 11 and interconnects the trailer to a towing vehicle 12, the latter being a conventional pick-up truck. The trailer 11 is provided with ground wheels 13 and it will be seen that the goose neck hitch device is connected to a coupling 15 located in the truck bed 14 of the pick-up truck. The coupling connection between the goose neck hitch device and the pick-up truck is of conventional construction and does not, per se, form a part of the present invention.

The goose neck hitch device includes a hitch frame 16 comprised of a pair of rear vertical frame members 17 which extend upwardly and are rigidly secured to a lower transverse frame element 18 as best seen in FIG. 1. It will be noted that the lower transverse frame element 18 extends between and is rigidly affixed to the vertical member 17 and is also secured to the frame of the trailer. Similarly, the lower end portions of the vertical frame members 17 are also rigidly secured to the frame of the trailer. The upper ends of the vertical frame members are also rigidly interconnected by an upper transverse frame element 19. A vertical jack mechanism 20 is mounted on the lower transverse frame member 18 and is provided with an actuating handle 21 which projects laterally therefrom. The vertical jack mechanism is of conventional construction and is lowered to support the front end of the trailer when the latter is disconnected from the towing vehicle.

The hitch frame 16 also includes a pair of substantially identical elongate longitudinal frame members 22 which are generally of rectangular cross-sectional configuration and which are rigidly affixed to the upper ends of the vertical frame members 17. The longitudinal frame members converge forwardly and are rigidly secured to an upper hitch member 23, the latter being of tubular cross-sectional configuration. It will be noted that the upper hitch member 23 extends downwardly and forwardly from the longitudinal frame members and is provided at its upper end with an end plate 24. Triangular shaped gussets 25 extend between the lower front end portions of the longtiduinal frame members and the upper hitch member 23 to provide suitable reinforcement at this location.

An elongate lower hitch member 27 of generally tubular cross-sectional configuration has one end portion thereof telescopically positioned within the upper hitch member 23 and projects outwardly and slightly forwardly therefrom. The lower end portion of the lower hitch member 27 is provided with a coupling device 28 which engages the coupling 15 on the truck bed to thereby interconnect the goose neck hitch device to the pick-up truck. The lower hitch member 27 is also provided with an upper end plate 29 which is welded thereto and which has a centrally located opening 30 therein.

A cushioning mechanism is provided for absorbing and dampening shock impulses transferred through the goose neck hitch device from the trailer 11 when the latter is traveling over rough surface. To this end, a pair of small flat elongate bars 31 are provided and are disposed within the upper hitch member 23 and are welded to the upper surface of the upper end plate 29 of the lower hitch member 27. Bars 31 are laterally spaced apart, as best seen in FIG. 3, and each is rigidly secured at its upper ends to a circular plate 32, the latter having a central opening 33 therein. A threaded nut 34 is positioned between the bars 31 and between a pair of compressable cushioning elements 35. The cushioning elements 35 are of identical construction and each has an opening 35a therethrough, as best seen in FIG. 3. It will also be noted that each of the cushioning elements 35 has a pair of opposed flat surfaces 35b which are interconnected by a pair of arcuate surfaces 35c. It will be noted that the flat surfaces 35b of the cushioning elements engage the inner surfaces of the bars 31 while the arcuate surfaces 35c engage the inner surface of the upper hitch member 23.

An elongate threaded rod 36 projects through an opening in the upper end plate 24 of the upper hitch member 23 and also projects through the openings in the plate 32, the cushioning element 35, and the end plate 29. The rod 36 is threaded substantially throughout its length and threadedly engages the nut 34, the upper end of the rod having a hex head 37 thereon.

Referring again to FIG. 2, it will be noted that a generally cylindrically shaped slip collar 38 is disposed between the hex head 37 of the rod 36 and the upper end plate 24. The slip collar 38 has a bore 39 therethrough and is also provided with an enlarged bore or recess 30 adjacent its lower end to thereby define a shoulder 41. A pin 42 projects from opposite sides of the rod 32 adjacent its upper end and engages in the recess 42 to limit upward movement of the rod and lower hitch member relative to the upper hitch member.

When the towing vehicle and the trailer are traversing a rough or bumpy surface, the jolting movement of the trailer will be transferred directly to the goose neck hitch device 10 since the latter is rigidly affixed to the trailer. Ordinarily, these shock impulses would also be transferred to the pick-up truck bed and these jolts or shock impulses often affect the stability of the towing vehicle. However, these shock impulses will be transferred from the trailer to the hitch frame including the upper hitch member 23. However, downward movement of the upper hitch member will be transferred through the rod 36 and the nut 34 threaded thereon. Vertical movement of the rod and nut will be yieldably resisted by the rubber cushioning elements 35 and these shock impulses will be dampened. Therefore since the positive connection between the upper hitch member and the lower hitch member comprises the cushioning mechanism, the shock impulses will be dampened by the cushioning device. It will therefore be seen that instability of the towing vehicle resulting from traversing a rough surface while towing a trailer with the goose neck hitch device will be greatly minimized if not eliminated.

Attention is now directed to FIG. 4 wherein a slightly modified form of the invention is shown. The goose neck hitch device is substantially identical to that shown in the embodiment of FIGS. 1 to 3 but the goose neck hitch device does have a slightly modified form of the cushioning mechanism. In this respect, the upper hitch member 123 is of tubular construction and is provided with an end plate 124 which is welded to its upper end. Triangular shaped gussets 125 extend between the longitudinal frame members and the upper hitch member 123 to provide reinforcement thereat. Again it will be noted that the upper hitch member 123 extends downwardly and slightly forwardly from the longitudinal frame members. The upper hitch member 123 is provided with an opened lower end 126 and receives therethrough the elongate tubular lower hitch member 127, the latter having a coupling device 128 at its lower end for connection to the coupling device located on the bed of the pick-up truck.

It will be noted that the upper end of the lower hitch member 127 is provided with an upper end plate 129 which is welded thereto. It will be noted that the lower end portion of the upper hitch member is provided with aligned diametrically opposed openings 130 therein through which an elongate pin 132 extends. The pin 132 also extends through a selected pair of diametrically opposed slots 131 formed in the lower hitch member 127. In this respect, it will be noted that the lower hitch member 127 has a plurality of pairs of longitudinally spaced apart slots 131 therein through which the pin 132 may be positioned. With this arrangement, vertical movement of the lower hitch member relative to the upper hitch member is limited by the length of the selected slots 131 through which pin 132 extends.

An elongate threaded rod projects through an opening in the upper end plate 124 of the upper hitch member and is provided with a circular substantially flat plate 134 at its lower end which is affixed thereto. It will be noted that the plate 134 engages a yieldable member which is in the form of a flexible or yieldable bag 135 containing a compressable fluid such as air or the like. The bag 135 also engages the upper end plate 129 on the upper end of the lower hitch member 127. The upper end of the rod 126 is provided with a hex head 137 located exteriorly of the upper plate 124. A lock nut 128 is provided and is located exteriorly of the upper end plate 124 to lock the rod 136 in an adjusted position.

The lower end portion of the upper hitch member 123 is provided with an opening 129 therethrough and a lock nut 140 is disposed in registering relation with the opening 139. A set screw 141 having a head 142 thereon threadedly engages the lock nut 140 and projects through the opening 139 for engagement with the outer surface of the lower hitch member 127. With this arrangement, the lower hitch member may be adjusted or set in a predetermined position relative to the upper hitch member 123.

The modification of the cushioning device for the goose neck hitch device illustrated in FIG. 4 operates in a similar manner to that shown in the embodiment of FIG. 2. Shock impulses will be transmitted downwardly through the upper hitch member to the rod 136 and this downward movement will be yieldably resisted by the container 135 which absorbs and dampens any such forces. Therefore since these forces will be absorbed or dampened by the cushioning device, these forces will not be transferred directly to the towing vehicle.

From the foregoing description, it will be seen that I have provided a novel cushioning mechanism for a goose neck hitch device which is not only of simple and inexpensive construction, but one which functions in a more efficient manner than any heretofore known comparable device.

What is claimed is:

1. A goose neck hitch device for use in interconnecting a trailer to a towing vehicle comprising:

a goose neck frame, said frame including a pair of elongate vertical frame members adapted to be secured to the trailer at the front end thereof, a pair of elongate horizontal frame members each being rigidly secured to the upper end of one of said vertical frame members and projecting and converging forwardly therefrom, a tubular upper vertical hitch member rigidly secured to said longitudinal frame members and depending therefrom, a tubular lower vertical hitch member telescopically engaging said upper hitch member and having coupling means at the lower end thereof adapted to be coupled to cooperating coupling means on the towing vehicle forwardly at the rear portion of the towing vehicle, a cushioning mechanism including a yieldable member disposed interiorly of said upper hitch member and engaging the upper end portion of said lower hitch member, means on said upper hitch member engaging said yieldable member whereby said yieldable member is yieldable in response to vertical forces exerted by the trailer through the hitch frame to thereby absorb and dampen such forces.

2. The goose neck hitch device as defined in claim 1 wherein said engaging means on said upper hitch member includes an elongate rod secured to said upper hitch member, said yieldable member being formed of energy absorbing, yieldable material, means on said rod engaging said yieldable member whereby said yieldable member is yieldable in response to vertical forces exerted by the upper hitch member to absorb and dampen the vertical forces.

3. The goose neck hitch device as defined in claim 2 wherein said rod is vertically adjustable relative to the upper hitch member.

4. The goose neck hitch device as defined in claim 1 wherein said yieldable member comprises a sealed container containing a compressable fluid.

5. The goose neck hitch device as defined in claim 4 wherein said engaging means on said upper hitch member comprises an elongate rod secured to said upper hitch member and extending interiorly thereof, and means on said rod engaging said sealed container.

6. A goose neck hitch device for use in interconnecting a trailer to a towing vehicle comprising:

a goose neck frame, said frame including a pair of elongate vertical frame members adapted to be secured to the trailer at the front end thereof, a pair of elongate horizontal frame members each being rigidly secured to the upper end of one of said vertical frame members and projecting and converging forwardly therefrom, a tubular upper vertical hitch member rigidly secured to said longitudinal frame members and depending therefrom, a tubular lower vertical hitch member telescopically engaging said upper hitch member and having coupling means at the lower end thereof adapted to be coupled to cooperating coupling means on the towing vehicle forwardly of the rear portion of the towing vehicle, an elongate rod mounted on said upper tubular member and being vertically adjustable relative thereto, a nut mounted on said rod, a cushioning mechanism disposed between said upper hitch and said lower hitch members and including a pair of compressible elements each being formed of yieldable material and each being mounted on opposite sides of and engaging said nut whereby vertical forces exerted through the upper hitch members will be absorbed by the yieldable compressible elements.

* * * * *